United States Patent
Nelson

(10) Patent No.: US 6,285,089 B1
(45) Date of Patent: Sep. 4, 2001

(54) INDUCTION STATIC START FOR A TURBINE GENERATOR WITH A BRUSHLESS EXCITER AND ASSOCIATED METHODS

(75) Inventor: Robert J. Nelson, Lake Mary, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/448,653

(22) Filed: Nov. 24, 1999

(51) Int. Cl.$^7$ .......................................... F02C 9/00
(52) U.S. Cl. .................................. 290/52; 322/10
(58) Field of Search .................... 290/2, 31, 32, 290/52; 322/10, 11, 19

(56) References Cited

U.S. PATENT DOCUMENTS

| | | | |
|---|---|---|---|
| 3,809,914 | * 5/1974 | Kilgore et al. | 290/38 |
| 3,908,161 | * 9/1975 | Messenger | 322/29 |
| 4,994,684 | * 2/1991 | Lauw et al. | 290/52 |
| 5,055,764 | * 10/1991 | Rozman et al. | 322/10 |
| 5,068,590 | * 11/1991 | Glennon et al. | 322/10 |
| 5,097,195 | * 3/1992 | Rand et al. | 322/10 |
| 5,406,189 | * 4/1995 | Wohlberg et al. | 322/10 |
| 5,512,811 | 4/1996 | Latos et al. | 322/10 |
| 5,581,168 | * 12/1996 | Rozman et al. | 318/723 |
| 5,594,322 | * 1/1997 | Rozman et al. | 322/10 |
| 5,675,188 | 10/1997 | Utamura | 290/52 |
| 5,873,238 | 2/1999 | Bellows | 60/39.182 |
| 5,920,162 | * 7/1999 | Hanson et al. | 318/254 |
| 6,144,190 | * 11/2000 | Scott et al. | 322/25 |
| 6,175,217 | * 1/2001 | Da Ponte et al. | 322/19 |

FOREIGN PATENT DOCUMENTS 07245998   9/1995   (JP) .

* cited by examiner

Primary Examiner—Nicholas Ponomarenko

(57) ABSTRACT

In an electric power generation system (20) which includes a turbine (22) and a turbine generator (25) connected to the turbine (22) along a common shaft (21), an alternating current (AC) induction exciter (30) is provided which is connected to the turbine generator (25) for starting the turbine generator (25). The AC induction exciter (30) preferably includes an AC input (31), an exciter rotor (36), and a stationary alternating current output provider (35) responsive to the AC input (31) and positioned in electrical communication with the exciter rotor (36) for providing an alternating current output (34) to the exciter rotor (36) so that a voltage is generated regardless of the speed of the exciter rotor (36). The stationary alternating current provider (35) preferably includes a rectifier (32) responsive to the AC input (31) for rectifying the alternating current to a direct current (DC) and a DC-to-AC converter (33) responsive to the rectifier (32) for converting the direct current input to an alternating current output (34). A method of starting a turbine generator (25) is also provided.

7 Claims, 3 Drawing Sheets

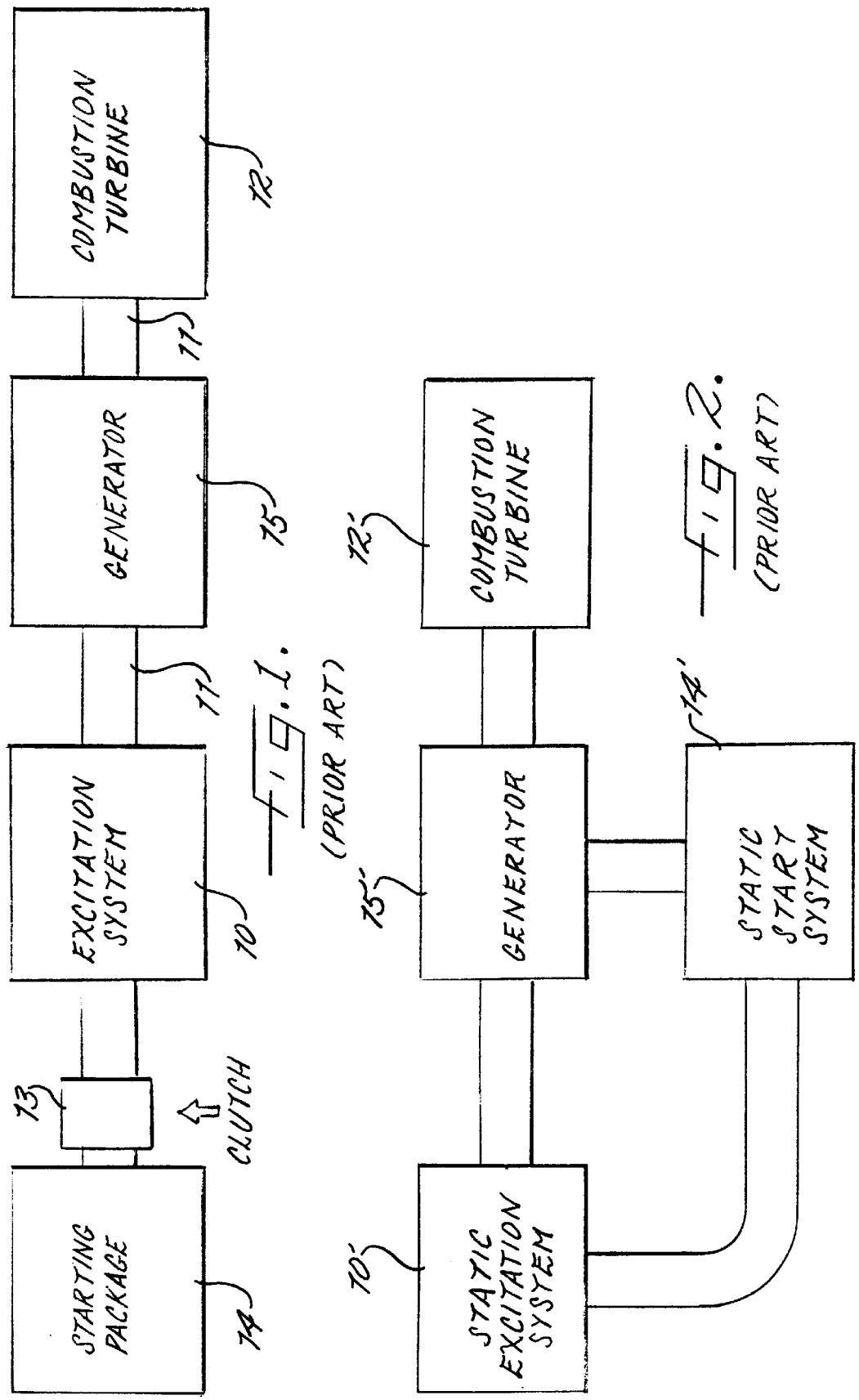

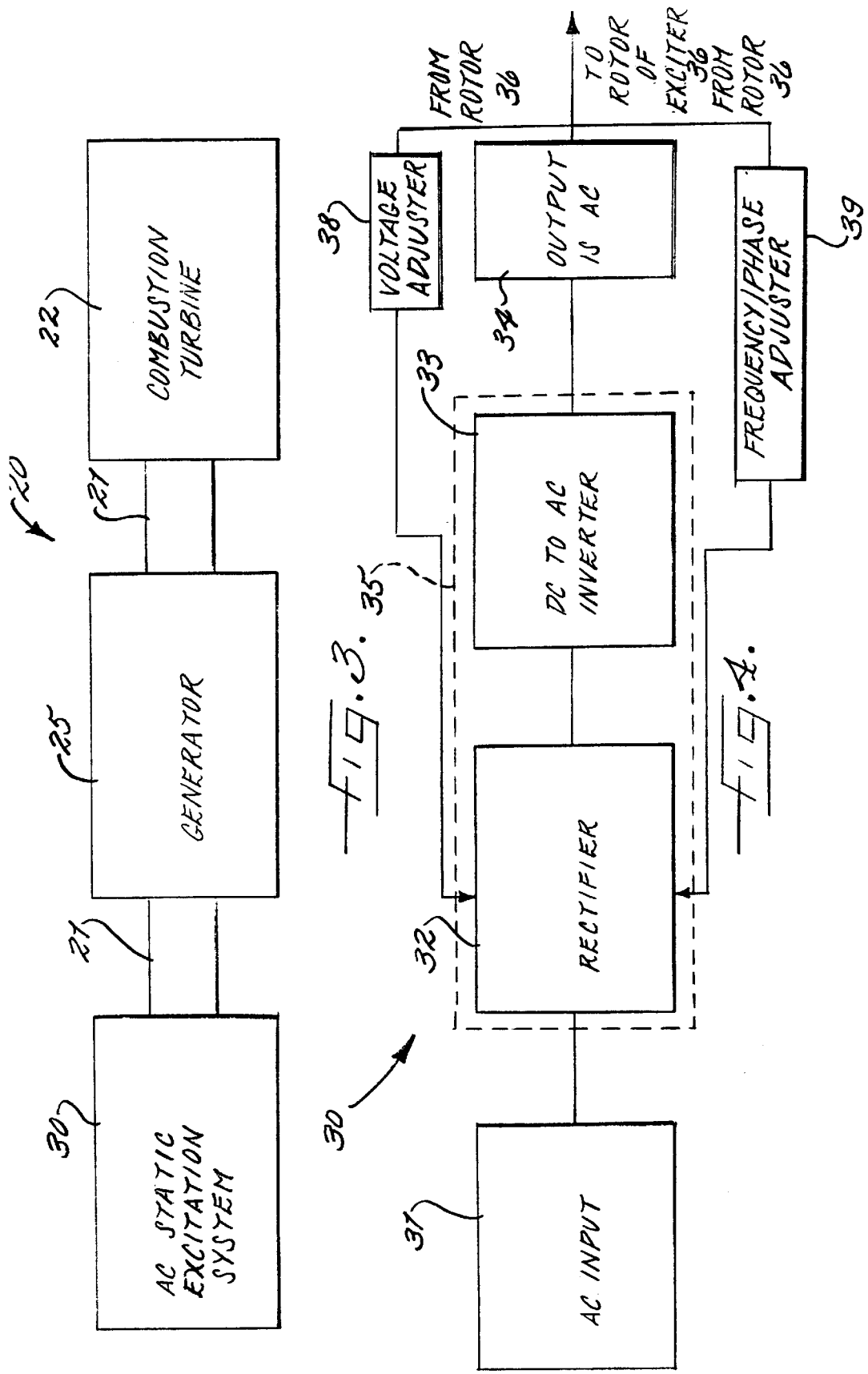

INDUCTION STATIC START FOR A TURBINE GENERATOR WITH A BRUSHLESS EXCITER AND ASSOCIATED METHODS

FIELD OF THE INVENTION

This invention is related to the power generation industry and, more particularly, to the field of starting turbine generators.

BACKGROUND OF THE INVENTION

For small generators in the power generation industry, particularly those that use air cooling, excitation requirements are relatively small, e.g., generally under 1 Megawatt of excitation power, and brushless excitation provides a cheaper and simpler means of providing excitation for a steam turbine generator. A brushless exciter conventionally includes a direct current ("DC") field winding, a main revolving armature alternating current ("AC") exciter, and a diode or rectifier wheel. The field of a rotating permanent magnet generator ("PMG"), rather than an electromagnet, is often used for the primary excitation. The pilot exciter AC output is rectified and DC power is provided to the brushless exciter field winding. The pilot exciter thereby eliminates the need for a continual external energy source. The brushless system eliminates the need for brushes and current collection components.

An example of such a shaft-driven, brushless excitation system 10 is shown in FIG. 1 where a combustion turbine 12 is connected to a combustion turbine generator ("CTG") 15 along a common shaft 11. A starting package 14 is conventionally used in such a system 10 and is also connected by the common shaft 11 to the brushless excitation system 10. A clutch 13 or torque converter is normally connected to the shaft 11 as illustrated as well and as understood by those skilled in the art. A CTG 15, however, does not have the capability to start itself so it requires some external means of starting or a starting package such as either a motor or a static starting system.

Static exciter starting systems, such as shown in FIG. 2, require that the generator 15' have field excitation. The static excitation systems can also be quite expensive. In other words, the prior art system as shown in FIG. 2 includes a static start 14' and a static excitation system 10' which has brushes or brush gears connected to the generator 15' along the common shaft 11' which also connects to the turbine 12'. A common reason given for not employing brushless excitation 10 in CTGs is that brushless excitation systems 10 are not compatible with static start 14'. This incompatibility is primarily due to the fact that the stationary field used by the existing design of brushless exciters in turbine-generators is a direct current ("DC") field. A DC field induces no voltage in a stationary armature so the generator 15 receives no field current at zero speed and cannot be started as a synchronous motor as required in a static starting system.

Static starting also requires that excitation be provided to the generator 15' at all speeds from zero to synchronous speed. At zero speed, a DC field voltage generates no voltage in a rotation armature so there is no field current supplied to the generator. Accordingly, the use of DC brushless excitation with static start has previously been confined to steam turbine-generators and motor start CTGs.

SUMMARY OF THE INVENTION

In view of the foregoing, the present invention advantageously provides an alternating current (AC) induction exciter and associated methods which has induction static start for a turbine generator. The present invention also provides an AC induction exciter and associated methods which advantageously provides the use of a stationary alternating current ("AC") field in lieu of a DC field in order to permit field generation at low speed or standstill so that brushless excitation can be used with static start. The present invention additionally advantageously provides an AC induction exciter and associated methods which more effectively control a power generator. The present invention further advantageously provides an electric power generation system which includes a combustion turbine generator and associated methods which allow a substantially lower cost excitation system to be used to start the combustion turbine generator.

More particularly, the present invention provides an electric power generation system which preferably includes a turbine, a turbine generator connected to the turbine along a common shaft, and an AC induction exciter connected to the turbine generator for starting the turbine generator. The AC induction exciter preferably includes an alternating current (AC) input, e.g., a three-phase AC input, an exciter rotor, and stationary alternating current output providing means responsive to the AC input and positioned in electrical communication with the exciter rotor for providing an alternating current output to the exciter rotor so that a voltage is generated regardless of the speed of the exciter rotor.

The present invention also provides a method for starting a turbine generator. The method preferably includes providing an alternating current (AC) input and providing a stationary alternating current to the exciter rotor so that a voltage is generated regardless of the speed of the exciter rotor. The step of providing a stationary alternating current can advantageously include rectifying the alternating current to a direct current (DC) and converting the direct current input to an alternating current output.

The electric power generation system, AC induction exciter, and associated methods of the present invention advantageously each provides a way of overcoming the objection of no field generation from conventional brushless exciters at standstill and low speed operation. By employing a stationary AC field winding in lieu of a stationary DC field winding in a static start brushless exciter, costs can be reduced by only requiring a few design changes to existing conventional brushless exciter designs. In essence, enough AC excitation can be applied to a field winding to induce a no-load field current in an AC armature. In addition to reducing the costs of a starting system for a turbine generator such as a combustion turbine generator (CTG), this design can also provide greater flexibility in the design of the rotating armature of the exciter as well, e.g., reducing the number of armature windings required.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is a schematic diagram of a brushless exciter system for a combustion turbine according to the prior art;

FIG. 2 is a schematic diagram of a static start for a static exciter system for a combustion turbine according to the prior art;

FIG. 3 is a schematic diagram of an AC induction exciter system for a turbine generator according to the present invention;

FIG. 4 is a schematic diagram of an AC induction exciter for a turbine generator according to a first embodiment of the present invention.

DETAILED DESCRIPTION OF PREFERRED EMBODIMENTS

Figure 5:
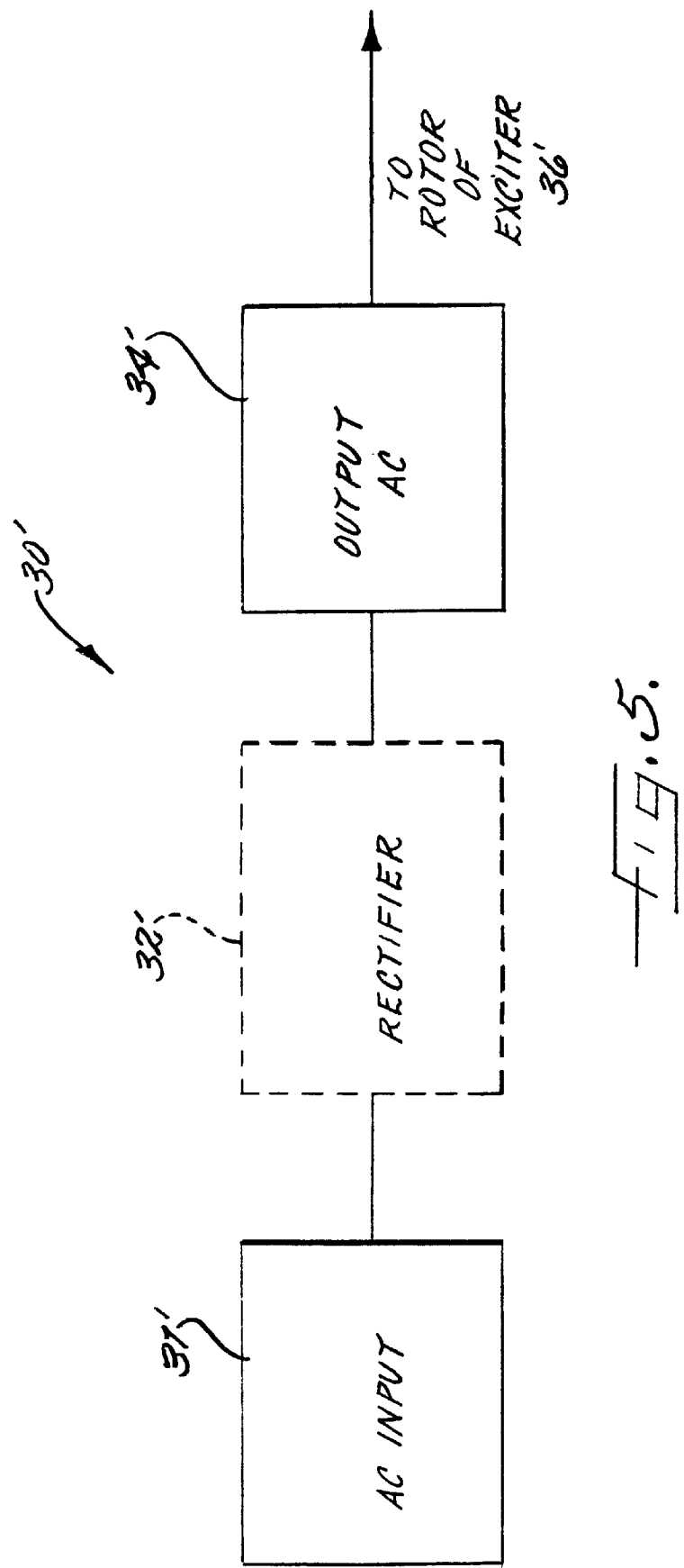
FIG. 5 is a schematic diagram of an AC induction exciter for a turbine generator according to a second embodiment of the present invention.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments.

FIG. 3 illustrates an alternating current (AC) induction exciter system 30 for a turbine generator 25, e.g., a combustion turbine generator (CTG), according to the present invention. The AC induction exciter 30 is particularly advantageous for CTG's, but can be used on steam turbine generators as well as understood by those skilled in the art. An electrical power generation system 20 preferably includes a turbine 22, e.g., a combustion turbine, a turbine generator, e.g., CTG, 25 connected to the turbine 22 along a common shaft or rotor 21, and an AC induction or static start brushless exciter 30 connected to the CTG 25 for starting the combustion turbine generator 25.

As perhaps best shown in FIG. 4, the AC induction exciter 30 preferably includes an alternating current (AC) input 31, e.g., preferably a three-phase AC input, an exciter rotor 36, and stationary alternating current output providing means, e.g., preferably provided by a stationary or static AC output provider 35, responsive to the AC input 31 and positioned in electrical communication with the exciter rotor 36 for providing an alternating current output 34 to the exciter rotor 36 so that a voltage is generated regardless of the speed of the exciter rotor 36. The AC input 31, as understood by those skilled in the art, can be one or more phases as desired for particular applications. The exciter rotor 36 is preferably the AC or main exciter having the AC armature associated therewith. As understood by those skilled in the art, the AC exciter preferably then connects to a diode wheel or rectifier which, in turn, is connected to or provides a rectified DC output to the CTG 25.

The AC induction exciter 30 also preferably includes at least one rotating armature associated with the rotor 36 having one or more coils positioned thereon as understood by those skilled in the art. The recognition of and the provision of the stationary or static AC brushless motor design advantageously allows the number of armature windings desired or needed to be reduced from the number of armature windings normally found in conventional DC brushless exciter designs. The AC induction exciter 30 of the present invention can also advantageously include an external blower as well understood by those skilled in the art.

The present invention, for example, can particularly be used with air cooled CTGs to reduce total excitation costs. The conventional exciters use a DC field which induces no voltage in a stationary armature so the CTG receives no field current at zero speed and cannot be started as a synchronous motor as required by most static starting systems. Static starting requires that excitation be provided to the CTG at all speeds from zero to synchronous. The use of the AC field in lieu of a DC field in a commercial brushless exciter advantageously permits field generation at low speed or standstill, as well as other speeds, so that a brushless exciter can be used with a static start process. The AC induction exciter system 30 also advantageously allows for the elimination of the need for a permanent magnet generator (PMG) often or usually found in conventional brushless systems.

As shown in FIG. 4, in a first embodiment of the present invention, the stationary alternating current providing means 35 preferably includes a rectifier 32 responsive to the AC input 31 for rectifying the alternating current to a direct current (DC). The rectifier 32 is preferably a phase-controlled rectifier as understood by those skilled in the art, but may also be a fixed bridge diode rectifier. A DC-to-AC converter, e.g., an inverter 33, is also preferably provided and is responsive to the rectifier 32 for converting the direct current input to an alternating current output 34 as illustrated. In other words, the regulator of a conventional brushless exciter is replaced with the rectifier 32 and the DC-to-AC converter 33 as illustrated.

The AC induction exciter 30 can also advantageously include voltage modifying means for modifying the exciter field voltage as the speed of the exciter rotor 36 varies. The voltage modifying means is preferably provided by a voltage adjuster circuit 38 which increases or decreases the voltage output to the exciter rotor as understood by those skilled in the art. Likewise, the AC induction exciter 30 can also include frequency and phase modifying means, e.g. provided by a frequency and phase adjuster circuit 39 as understood by those skilled in the art, for modifying either or both of the exciter field frequency and phase as the speed of the exciter rotor 36 varies, e.g., increases or decreases. It will be understood by those skilled in the art that the AC induction exciter 30 can include either frequency modifying means, phase modifying means, or frequency and phase modifying means as desired.

As shown in FIG. 5, in a second embodiment of the present invention, the stationary alternating current providing means 35' is preferably provided by a circuit connector or conductors which connect the AC input 31' to provide a more direct AC output 34'. This embodiment can be less expensive to construct because as shown by the dashed line, the phase controlled rectifier 32' is absent, removed, or not included in this embodiment. Likewise, an inverter or DC-to-AC converter 33 would not be required as well.

As illustrated in FIGS. 3–5, the present invention also provides a method for starting a turbine generator 25. The method preferably includes providing an alternating current (AC) input 31 and providing a, stationary alternating current to the exciter rotor 36 so that a voltage is generated regardless of the speed of the exciter rotor 36. The step of providing a stationary alternating current can advantageously include rectifying the alternating current to a direct current (DC) and converting the direct current input to an alternating current output 34. The method can also include modifying the exciter field voltage as the speed of the exciter rotor 36 varies, e.g., increases or decreases, and/or modifying the exciter field frequency as the speed of the exciter rotor 36 varies.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. An electric power generation system comprising:

a combustion turbine;

a combustion turbine generator connected to the combustion turbine along a common shaft; and an alternating current (AC) induction exciter connected to the combustion turbine generator for starting the combustion turbine generator, said AC induction exciter including an AC input, an exciter rotor, and stationary alternating current output providing means responsive to said AC input and positioned in electrical communication with said exciter rotor for providing an alternating current output to the exciter rotor so that a voltage is generated regardless of the speed of the exciter rotor, said stationary alternating current providing means including a rectifier responsive to said AC input for rectifying the alternating current to a direct current (DC) and a DC-to-AC converter responsive to said rectifier for converting the direct current input to an alternating current output.

2. A system as defined in claim 1, wherein said AC induction exciter includes voltage modifying means for modifying the exciter field voltage as the speed of the exciter rotor varies.

3. A system as defined in claim 1, wherein said AC induction exciter includes frequency modifying means for modifying the exciter field frequency as the speed of the exciter rotor varies.

4. A system as defined in claim 1, wherein said AC induction exciter includes phase modifying means for modifying the exciter field phase as the speed of the exciter rotor varies.

5. A system as defined in claim 1, wherein the exciter rotor of said AC induction exciter includes at least one rotating armature having one or more coils positioned thereon.

6. A system as defined in claim 5, wherein said rectifier of said AC induction exciter comprises a phase controlled rectifier.

7. A system as defined in claim 6, wherein the AC input includes a three-phase AC input.

* * * * *